(12) United States Patent
Benhase et al.

(10) Patent No.: US 9,372,642 B2
(45) Date of Patent: Jun. 21, 2016

(54) RAID 10 READS OPTIMIZED FOR SOLID STATE DRIVES

(71) Applicant: International Business Machines Corporation, Armonk, NY (US)

(72) Inventors: Michael T. Benhase, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/947,358

(22) Filed: Jul. 22, 2013

(65) Prior Publication Data
US 2015/0026514 A1 Jan. 22, 2015

(51) Int. Cl.
G06F 11/00 (2006.01)
G06F 3/06 (2006.01)
G06F 11/20 (2006.01)

(52) U.S. Cl.
CPC .............. G06F 3/0688 (2013.01); G06F 3/061 (2013.01); G06F 3/0659 (2013.01); G06F 11/2066 (2013.01); G06F 11/2087 (2013.01)

(58) Field of Classification Search
CPC . G06F 11/2066; G06F 3/0688; G06F 3/0689; G06F 3/061; G06F 3/0617; G06F 3/065; G06F 9/505; G06F 9/5016; G06F 9/5083
See application file for complete search history.

(56) References Cited

U.S. PATENT DOCUMENTS

| | | | |
|---|---|---|---|
| 7,467,168 B2 * | 12/2008 | Kern et al. | |
| 7,945,669 B2 * | 5/2011 | Bober et al. | 709/226 |
| 8,397,011 B2 | 3/2013 | Ashwood | |
| 8,473,677 B2 * | 6/2013 | Gladwin et al. | 711/114 |
| 2008/0282030 A1 | 11/2008 | Kalwitz et al. | |
| 2010/0082879 A1 * | 4/2010 | McKean et al. | 711/103 |
| 2010/0100664 A1 | 4/2010 | Shimozono | |
| 2012/0036309 A1 * | 2/2012 | Dillow et al. | 711/103 |
| 2012/0066448 A1 * | 3/2012 | Colgrove et al. | 711/114 |
| 2013/0179631 A1 * | 7/2013 | Cepulis | 711/103 |
| 2013/0227180 A1 * | 8/2013 | Bisht et al. | 710/39 |
| 2014/0068621 A1 * | 3/2014 | Sitaraman et al. | 718/102 |

FOREIGN PATENT DOCUMENTS

| | | |
|---|---|---|
| CN | 102023810 A | 4/2011 |
| DE | 69521549D1 | 8/2001 |

OTHER PUBLICATIONS

Jeremic, Nikolaus et al., "The Pitfalls of Deploying Solid-State Drive RAIDs", SYSTOR 2011, May 30-Jun. 1, 2011, Haifa, Israel, 13 pages.

* cited by examiner

*Primary Examiner* — Yolanda L Wilson
(74) *Attorney, Agent, or Firm* — Stephen R. Tkacs; Stephen J. Walder, Jr.; Randall J. Bluestone

(57) ABSTRACT

A mechanism is provided in a data processing system. The mechanism determines a maximum queue depth of a queue for each solid state drive in a plurality of solid state drives. A given data block is mirrored between a group of solid state drives within the plurality of solid state drives. The mechanism tracks outstanding input/output operations in a queue for each of the plurality of solid state drives. For a given read operation to read the given data block, the mechanism identifies a solid state drive within the group of solid state drives based on a number of empty slots in the queue of each solid state drive within the group of solid state drives.

20 Claims, 3 Drawing Sheets

RAID 10 READS OPTIMIZED FOR SOLID STATE DRIVES

BACKGROUND

The present application relates generally to an improved data processing apparatus and method and more specifically to mechanisms for optimizing redundant array of independent disks reads for solid state drives.

RAID (redundant array of independent disks) is a storage technology that combines multiple disk drive components into a logical unit. A RAID controller distributes data across the drives in one of several ways called "RAID levels," depending on what level of redundancy and performance is desired. RAID is now used as an umbrella term for computer data storage schemes that can divide and replicate data among multiple physical drives: RAID is an example of storage virtualization and the array can be accessed by the operating system as one single drive. The different schemes or architectures are named by the word RAID followed by a number (e.g., RAID 0, RAID 1). Each scheme provides a different balance between the key goals: reliability, availability, performance, and capacity.

RAID 0 (block-level striping without parity or mirroring) has no redundancy. It provides improved performance and additional storage but no fault tolerance. Any drive failure destroys the array, and the likelihood of failure increases with more drives in the array. A single drive failure destroys the entire array because when data is written to a RAID 0 volume, the data is broken into fragments called blocks. The number of blocks is dictated by the stripe size, which is a configuration parameter of the array. The blocks are written to their respective drives simultaneously. This allows smaller sections of the entire chunk of data to be read off each drive in parallel, increasing bandwidthMore drives in the array means higher bandwidth, but greater risk of data loss.

In RAID 1 (mirroring without parity or striping), data is written identically to two drives, thereby producing a "mirrored set"; the read request is serviced by either of the two drives containing the requested data. One implementation for a system of hard disk drives is to select the copy that involves least seek time plus rotational latency. Similarly, a write request updates both drives. The write performance depends on the slower of the two writes; at least two drives are required to constitute such an array. While more constituent drives may be employed, many implementations deal with a maximum of only two. The array continues to operate as long as at least one drive is functioning. With appropriate operating system support, there can be increased read performance, and only a minimal write performance reduction; implementing RAID 1 with a separate controller for each drive in order to perform simultaneous reads (and writes) is sometimes called "multiplexing" (or "duplexing" when there are only two drives).

In RAID 10 (mirroring and striping), data is written in stripes across primary disks that have been mirrored to secondary disks. A typical RAID 10 configuration consists of four drives, two for striping and two for mirroring. A RAID 10 configuration takes the best concepts of RAID 0 and RAID 1, and combines them to provide better performance and reliability. RAID 10 is often referred to as RAID 1+0 (mirrored+striped).

SUMMARY

In one illustrative embodiment, a method, in a data processing system. The method comprises determining a maximum queue depth of a queue for each solid state drive in a plurality of solid state drives. A given data block is mirrored between a group of solid state drives within the plurality of solid state drives. The method further comprises tracking outstanding input/output operations in a queue for each of the plurality of solid state drives. The method further comprises for a given read operation to read the given data block, identifying a solid state drive within the group of solid state drives based on a number of empty slots in the queue of each solid state drive within the group of solid state drives.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for optimizing redundant array of independent disks reads for solid state drives. The mechanism issues reads based on which solid state drive has more room in its queue. The mechanism issues reads and writes and keeps track of how many operations are outstanding. The mechanism determines a queue depth for each drive. When a read is to be issued, the mechanism selects a solid state drive that has the most outstanding slots in its queue.

Figure 1:
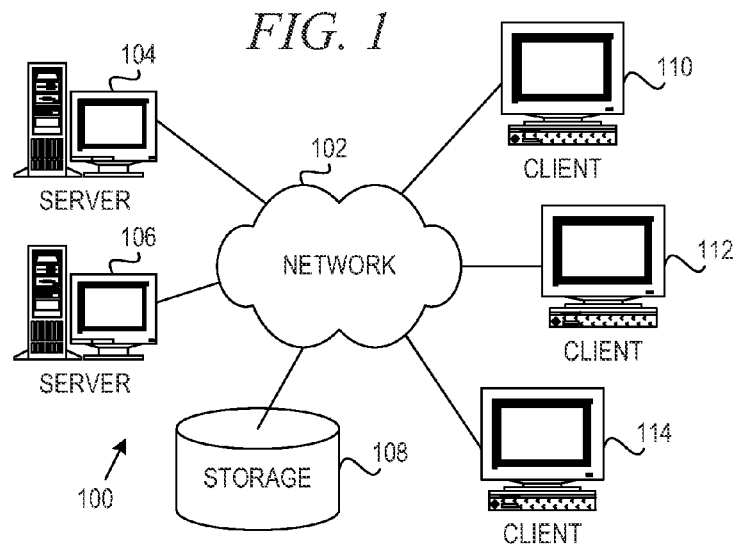
FIG. 1 depicts a pictorial representation of an example distributed data processing system in which aspects of the illustrative embodiments may be implemented.
Figure 2:
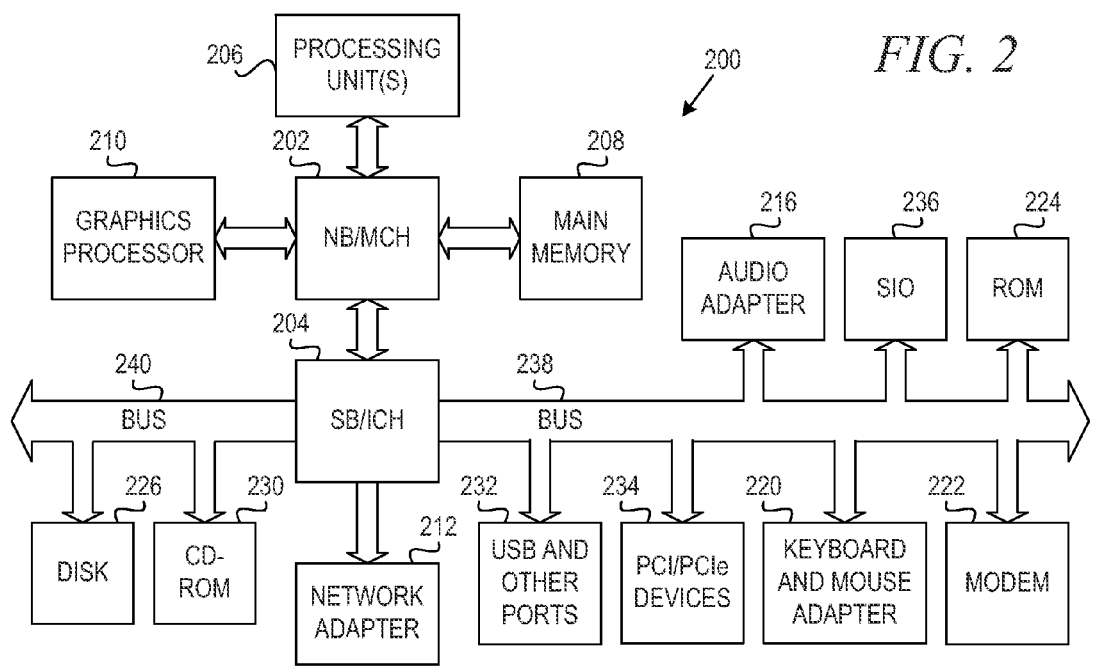
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication Links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LIMA is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3A:
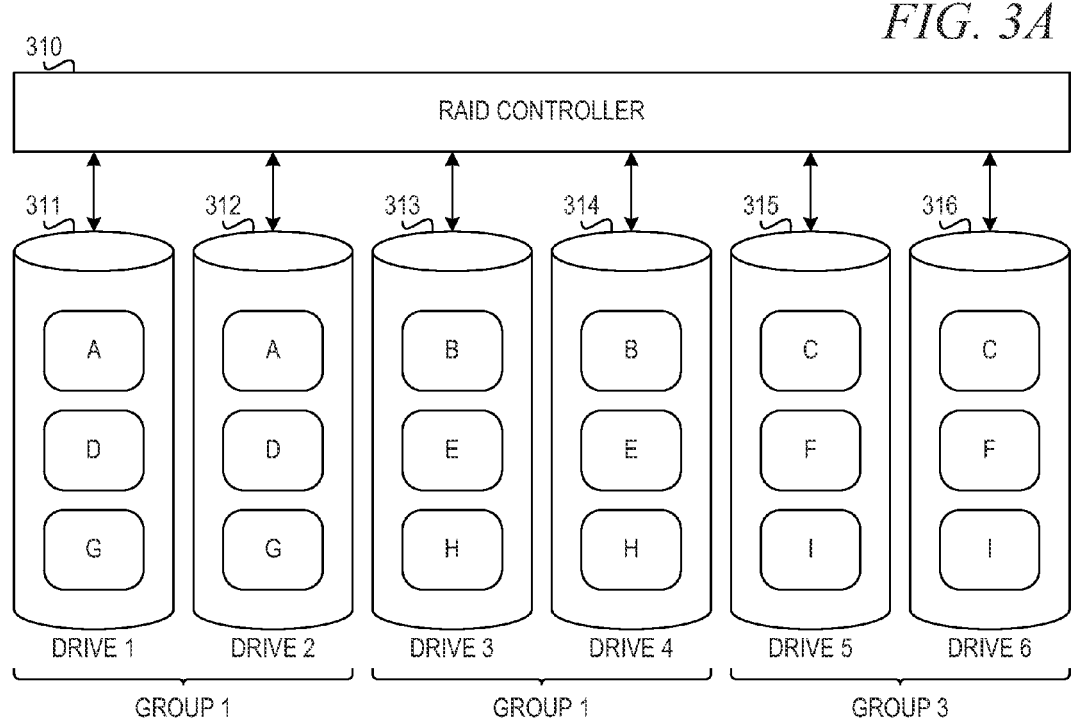
FIG. 3A is a block diagram of a redundant array of independent disks configuration with optimized reads in accordance with an illustrative embodiment.

FIG. 3A is a block diagram of a redundant array of independent disks configuration with optimized reads in accordance with an illustrative embodiment. The redundant array of independent disks (RAID) configuration is a RAID 10 configuration with mirroring and striping. RAID controller 310 stripes data blocks across drive groups and mirrors data blocks within a drive group. For example, RAID controller 310 may divide data to be written into data blocks A, B, and C. RAID controller 310 then writes data block A to group 1, writes data block B to group 2, and writes data block C to group 3. Group 1 includes drive 1 311 and drive 2 312; group 2 includes drive 3 313 and drive 4 314; group 3 includes drive 5 315 and drive 6 316.

RAID 10 requires at least four drives: two drives for striping and two drives for mirroring. RAID 10 may include more than four drives—usually an even number—depending on how many blocks, or stripes, are to be written for each unit of data. In the depicted example, each unit of data is divided into three stripes. Conceivably, a RAID 10 configuration may also include more than one mirror, resulting in more than two drives in a group; however, a typical RAID 10 configuration will include two drives per group.

RAID controller 310 may be a hardware controller, such as a storage controller in a standalone computer system, a server, or a storage enclosure. Alternatively, RAID controller 310 may be a storage controller card or blade in a server chassis. In another alternative embodiment, RAID controller 310 may be RAID software or firmware executing within a desktop or server computer environment or within a virtual machine manager.

RAID 10 is often used for critical performance applications. In fact, RAID 10 is often the RAID level to use with guaranteed response time offerings. RAID 10 accelerates read operations, because the RAID controller may distribute read operations between multiple drives. RAID 10 algorithms have been developed over the years for hard disk drives (HDDs). However, with HDDs, RAID controller 310 would typically alternate read operations between the pair of drives (e.g., drive 313 and drive 314), or selects a HDD to which to issue a read operation based on how far the HDD has to seek.

A solid-state drive (SSD) is a data storage device that uses integrated circuit assemblies as memory to store data persistently. SSD technology uses electronic interfaces compatible with traditional block input/output (I/O) hard disk drives. SSDs do not employ any moving mechanical components, which distinguishes them from traditional magnetic disks such as hard disk drives (HDDs) or floppy disks, which are electromechanical devices containing spinning disks and movable read/write heads. Compared with electromechanical disks, SSDs are typically less susceptible to physical shock and are usually silent. More importantly, SSDs have lower access time and latency because they have no seek time. For this reason, existing RAID 10 algorithms may not be optimal for configurations with SSDs.

In accordance with the illustrative embodiment, drives 311-316 are solid state drives. RAID controller 310 issues read operations based on which solid state drive has more room in its queue. Since SSDs must perform garbage collection to reclaim space, various amounts of background activity may exist in the mirrored pairs. By examining queue depth, it is possible to determine which drive is the least busy at the current time. RAID controller 310 issues reads and writes and keeps track of how many operations are outstanding. RAID controller 310 determines a queue depth for each drive. When a read operation is to be issued, RAID controller 310 selects a solid state drive that has the most outstanding slots in its queue.

Because reads and writes are issued to SSDs at the same time and they have the potential to do so many more operations, the response time can be skewed if one device in a RAID 10 pair is having to do more read operations or is performing more background operations than the other device in the pair. Skew is not only caused by having more read operations issued, but may be caused by reaching the maximum queue depth of a particular drive and therefore either queuing read operations within the controller 310 or, worse, not being able to accept any more reads from the requesting host.

Figure 3B:
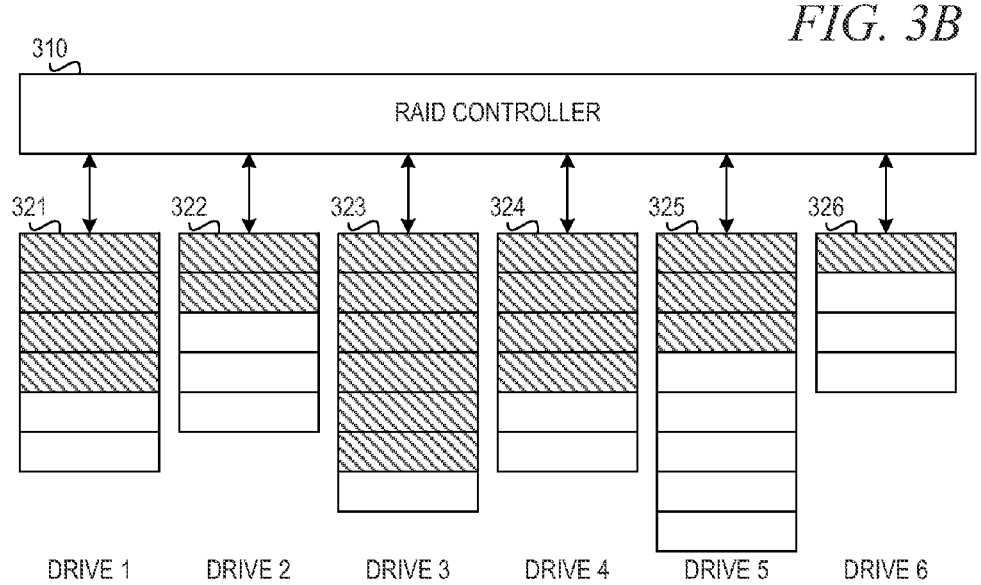
FIG. 3B illustrates queue management for redundant array of independent disks read and write operations in accordance with an illustrative embodiment.

FIG. 3B illustrates queue management for redundant array of independent disks read and write operations in accordance with an illustrative embodiment. RAID controller 310 maintains a queue 321-326 for each drive. RAID controller 310 selects a maximum queue depth for each drive depending on a number of factors, many of which are outside the scope of this description. RAID controller 310 issues reads based on which drive has more room in its queue. For example, when reading from group 1, RAID controller 310 issues the read operation to a drive selected between drive 1 311 and drive 2 312 based on which drive has the most outstanding slots in its queue. In the depicted example, queue 322 has more outstanding slots than queue 321; therefore, RAID controller 310 issues the read operation to drive 2 312.

Thus, RAID controller 310 determines the drive must be capable of handling the read operations. This results in keeping overall response times optimally low because skew is kept to a minimum. If one drive is skewed, response time for its reads will be determined by the elapsed time involved in cycling through items on the queue. Therefore, long response times can start to develop even if some devices are relatively idle. Even though the illustrative embodiment concerns read operations, RAID controller 310 takes both read operations and write operations into account when issuing reads. RAID controller 310 calculates empty slots by taken maximum operations as follows:

$$empty\_slots = (reads + writes) - (reads\_issued + writes\_issued)$$

wherein (reads+writes) is the maximum number of operations in the maximum queue depth and (reads_issued+writes_issued) is the total number of operations issued to the SSD.

In accordance with one aspect of the illustrative embodiment, certain processes in an SSD may cause the SSD to return a max queue depth adjustment number in a status message. A max queue depth adjustment of 0 (zero) indicates no adjustment to the queue at all. A max queue depth adjustment of −1 indicates to reduce by one the max queue depth. For instance, if the SSD detects a background process, such as read disturb mitigation, then the SSD returns a max queue depth adjustment of −1 for that drive. The RAID controller 310 examines the difference between SSDs in a pair to adjust what the maximum operations for a drive should be and which SSD should be issued a read operation. When a background process completes, the SSD may return a max depth adjustment of 0 to indicate that reducing queue depth is not necessary.

Conditions that can result in a maximum queue depth reduction are as follows:

1. Internal RAID rebuild inside the drive.
2. Switching from mostly sequential to mostly random operations, meaning that due to preconditioning, the drive may less than optimal for a
3. A high number of relocates due to read disturb storms.
4. Block retirement reaching a certain level.
5. Free blocks for garbage collection reaching a critical point.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
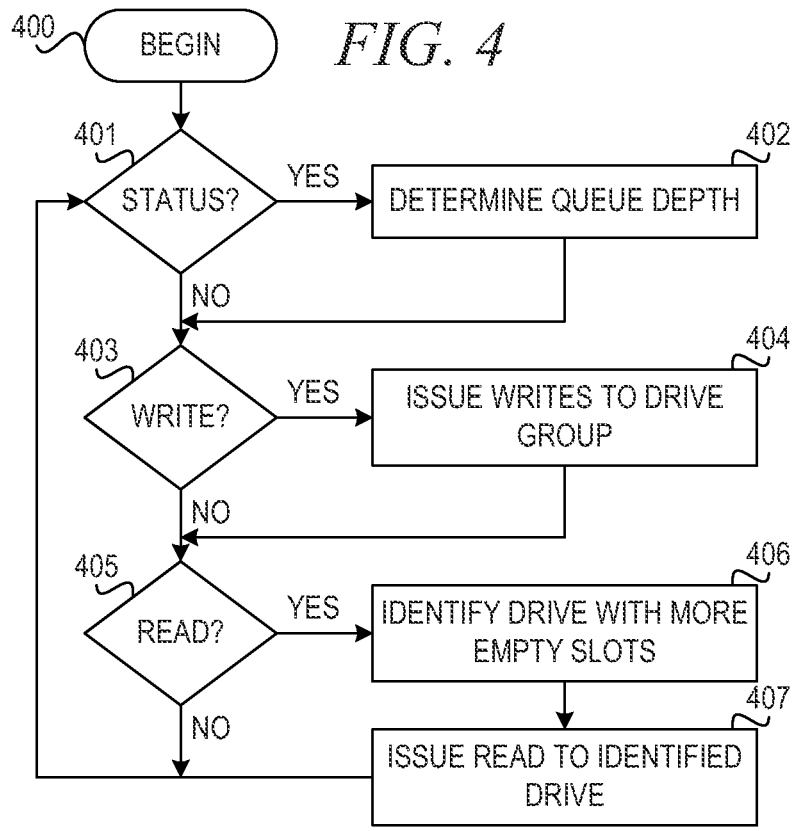
FIG. 4 is a flowchart illustrating operation of a redundant array of independent disks controller in accordance with an illustrative embodiment.

FIG. 4 is a flowchart illustrating operation of a redundant array of independent disks controller in accordance with an illustrative embodiment. Operation begins (block 400) and the redundant array of independent disk (RAID) controller determines whether a status message is received from a solid state drive (SSD) (block 401). If a status message is received, the RAID controller determines a queue depth for the SSD (block 402). The RAID controller may determine a maximum queue depth based on a number of factors. More particularly, the RAID controller may determine the maximum queue depth for the SSD based on a maximum queue depth adjustment number received in the status message.

Thereafter, or if a status message is not received in block 401, the RAID controller determines whether a write operation is to be performed (block 403). If a write operation is to be performed to write a data block for a stripe, the RAID controller issues the write operation to all SSDs in a selected group (block 404).

Thereafter, or if a write operation is not to be performed in block 403, the RAID controller determines whether a read operation is to be performed (block 405). If a read operation is to be performed to read a data block, the RAID controller identifies a SSD with more empty slots in its queue (block 406) and issues the read to the identified SSD (block 407). Thereafter, or if a read operation is not to be issued in block 405, operation returns to block 401 to determine whether a status message is received from an SSD.

Figure 5:
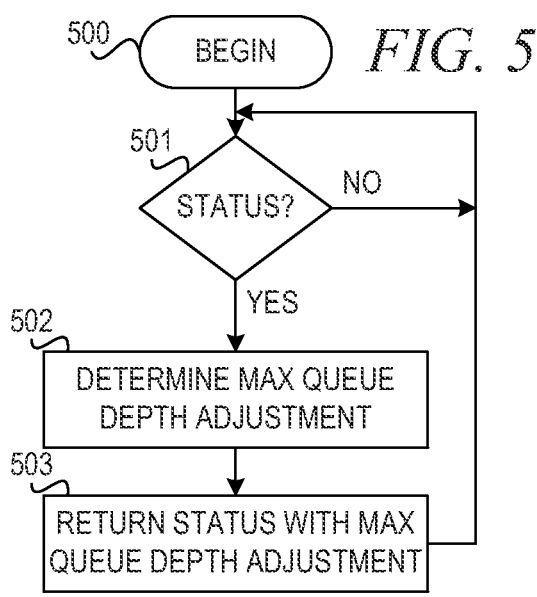
FIG. 5 is a flowchart illustrating operation of a solid state drive in accordance with an illustrative embodiment.

FIG. 5 is a flowchart illustrating operation of a solid state drive in accordance with an illustrative embodiment. Operation begins (block 500), and the solid state drive (SSD) determines whether a status message is to be sent to the RAID controller (block 501). If a status message is not to be sent, operation returns to block 501 until a status message is to be sent to the RAID controller.

If a status message is to be sent to the RAID controller in block 501, the SSD determines a maximum queue depth adjustment number (block 502) and returns the status message with the maximum queue depth adjustment number (block 503). Thereafter, operation returns to block 501 to determine whether a status message is to be sent to the RAID controller.

In accordance with one aspect of the illustrative embodiment, certain processes in an SSD may cause the SSD to return a max queue depth adjustment number in a status message. A max queue depth adjustment of 0 (zero) indicates no adjustment to the queue at all. A max queue depth adjustment of −1 indicates to reduce by one the max queue depth. For instance, if the SSD detects a background process, such as read disturb mitigation, then the SSD returns a max queue depth adjustment of −1 for that drive. When a background process completes, the SSD may return a max depth adjustment of 0 to indicate that reducing queue depth is not necessary.

Conditions that can result in a maximum queue depth reduction are as follows:

1. Internal RAID rebuild inside the drive.
2. Switching from mostly sequential to mostly random operations, meaning that due to preconditioning, the drive may less than optimal for a while.
3. A high number of relocates due to read disturb storms.
4. Block retirement reaching a certain level.
5. Free blocks for garbage collection reaching a critical point.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for optimizing redundant array of independent disks reads for solid state drives. The mechanism issues reads based on which solid state drive has more room in its queue. The mechanism issues reads and writes and keeps track of how many operations are outstanding. The mechanism determines a queue depth for each drive. When a read is to be issued, the mechanism selects a solid state drive that has outstanding slots in its queue.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers, Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, comprising:
   determining a maximum queue depth of a queue for each solid state drive in a plurality of solid state drives, wherein a given data block is mirrored between a group of solid state drives within the plurality of solid state drives;
   tracking outstanding input/output operations in a queue for each of the plurality of solid state drives;
   for a given read operation to read the given data block, identifying a solid state drive within the group of solid state drives based on a number of empty slots in the queue of each solid state drive within the group of solid state drives; and
   issuing the given read operation to the identified solid state drive to read the given data block.

2. The method of claim 1, wherein the data block is a stripe of data being written to the plurality of solid, state drives, wherein the plurality of solid state drives are configured as a redundant array of independent disks with mirroring and striping.

3. The method of claim 1, further comprising:
receiving a maximum queue depth adjustment value from each solid state drive; and
determining the maximum queue depth for each solid state drive based on its maximum queue depth adjustment value.

4. The method of claim 3, wherein the maximum queue depth adjustment value is received in a status message from each solid state drive.

5. The method of claim 3, wherein solid state drive sets the maximum queue depth adjustment value responsive to at least one of an internal redundant array of independent disks rebuild inside the solid state drive, switching from mostly sequential to mostly random operations, a predetermined number of relocates due to read disturb storms, block retirement reaching a predetermined level, or free blocks for garbage collection reaching a critical point.

6. The method of claim 1, further comprising:
determining the number of empty slots in the queue of each solid state drive, comprising subtracting the total number of read and write operations issued to each given solid state drive from the maximum queue depth of the given solid state drive.

7. A computer program product comprising a non-transitory computer readable storage medium having a computer readable program stored therein, wherein the computer readable program, when executed on a computing device, causes the computing device to:
determine a maximum queue depth of a queue for each solid state drive in a plurality of solid state drives, wherein a given data block is mirrored between a group of solid state drives within the plurality of solid state drives;
track outstanding input/output operations in a queue for each of the plurality of solid state drives;
for a given read operation to read the given data block, identify a solid state drive within the group of solid state drives based on a number of empty slots in the queue of each solid state drive within the group of solid state drives; and
issue the given read operation to the identified solid state drive to read the given data block.

8. The computer program product of claim 7, wherein the data block is a stripe of data being written to the plurality of solid state drives, wherein the plurality of solid state drives are configured as a redundant array of independent disks with mirroring and striping.

9. The computer program product of claim 7, wherein the computer readable program further causes the computing device to:
receive a maximum queue depth adjustment value from each solid state drive; and
determine the maximum queue depth for each solid state drive based on the maximum queue depth adjustment value.

10. The computer program product of claim 9, wherein the maximum queue depth adjustment value is received in a status message from each solid state drive.

11. The computer program product of claim 9, wherein each solid state drive sets the maximum queue depth adjustment value responsive to at least one of an internal redundant array of independent disks rebuild inside the solid state drive, switching from mostly sequential to mostly random operations, a predetermined number of relocates due to read disturb storms, block retirement reaching a predetermined level, or free blocks for garbage collection reaching a critical point.

12. The computer program product of claim 7, wherein the computer readable program further causes the computing device to:
determine the number of empty slots in the queue of each solid state drive, comprising subtracting the total number of read and write operations issued t each given solid state drive front the maximum queue depth of the given solid state drive.

13. The computer program product of claim 7, wherein the computer readable program is stored in a computer readable storage medium in a data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system computer readable storage medium with the remote system.

15. An apparatus, comprising:
a processor; and
a memory coupled to the processor, wherein the memory comprises instructions which, when executed by the processor, cause the processor to
determine a maximum queue depth of a queue for each solid state drive in a plurality of solid state drives, wherein a given data block is mirrored between a group of solid state drives within the plurality of solid state drives;
track outstanding input/output operations in a queue for each of the plurality of solid state drives;
for a given read operation to read the given data block, identify a solid state drive within the group of solid state drives based on a number of empty slots in the queue of each solid state drive within the group of solid state drives; and
issue the given read operation to the identified solid state drive to read the given data block.

16. The apparatus of claim 15, wherein the data block is a stripe of data being written to the plurality of solid state drives, wherein the plurality of solid state drives are configured as a redundant may of independent disks with mirroring and striping.

17. The apparatus of claim 15, wherein the instructions further cause the processor to:
receive a maxim queue depth adjustment value from each solid state drive; and
determine the maximum queue depth for each solid state drive based on the maximum queue depth adjustment value.

18. The apparatus of claim 17, wherein the maximum queue depth adjustment value is received in a status message from each solid state drive.

19. The apparatus of claim 17, wherein each solid state drive sets the maximum queue depth adjustment value responsive to at least one of an internal redundant may of independent disks rebuild inside the solid state drive, switching from mostly sequential to mostly random operations, a predetermined number of relocates due to read disturb storms, block retirement reaching a predetermined level, or free blocks for garbage collection reaching a critical point.

20. The apparatus of claim 15, wherein the instructions further cause the processor to:
determine the number of empty slots in the queue of each solid state drive, comprising subtracting the total number of read and write operations issued to each given solid state drive from the maximum queue depth of the given solid state drive.

* * * * *